United States Patent [19]

Hermans

[11] 4,033,130

[45] July 5, 1977

[54] HEATING DEVICE COMPRISING A HEAT ACCUMULATOR

[75] Inventor: Matthias Leonardus Hermans, Eindhoven, Netherlands

[73] Assignee: U.S. Philips Corporation, New York, N.Y.

[22] Filed: June 18, 1976

[21] Appl. No.: 697,358

Related U.S. Application Data

[63] Continuation of Ser. No. 571,405, April 24, 1975, abandoned.

[30] Foreign Application Priority Data

May 3, 1974 Netherlands .................... 7405947

[52] U.S. Cl. .................................. 60/523; 60/517; 60/524; 165/104 S; 165/105; 219/326; 219/378; 219/530

[51] Int. Cl.² ..................... F28D 15/00; F03G 7/06

[58] Field of Search ................... 60/517, 523, 524; 165/104 S, 105; 126/400; 219/326, 378, 530

[56] References Cited

UNITED STATES PATENTS

| | | | |
|---|---|---|---|
| 3,029,596 | 4/1962 | Hanold et al. | 60/524 |
| 3,817,322 | 6/1974 | Asselman et al. | 165/105 |

*Primary Examiner*—Albert W. Davis, Jr.
*Attorney, Agent, or Firm*—Frank R. Trifari

[57] ABSTRACT

A heating system including a heat pipe containing evaporable heat transporting material, a closed reservoir containing heat-accumulating material within said heat pipe, and a quantity of said evaporable material in said reservoir for maintaining the same pressure in said reservoir and in said heat pipe.

14 Claims, 3 Drawing Figures

HEATING DEVICE COMPRISING A HEAT ACCUMULATOR

This is a continuation of application Ser. No. 571,405, filed Apr. 24, 1975, now abandoned.

BACKGROUND OF THE INVENTION

The invention relates to a heating device for supplying heat to a heat user, comprising a closed space within which one or more closed reservoirs are arranged which in operation contain a heat-accumulating material which can be heated by means of at least one primary heat source. The said heat-accumulating material is adapted to act as a secondary heat source for exchanging heat, via one or more heat-transmitting reservoir walls, with a heat transport medium which is present in the closed space and which transports heat from the reservoirs to the heat user by an evaporation/-condensation cycle. Heating devices of the kind set forth are known from the co-pending U.S. Ser. No. 262,665 and U.S. Pat. No. 3,817,322.

The heat-accumulating material may be a material which remains in the solid state in any operating condition (for example, $Al_2O_3 \cdot BeO$; TiO, $MgO_2$; $SiO_2$), so that only sensible heat is stored, or a material in which the storage of heat is achieved mainly by utilizing the transition from the solid to the liquid phase (melting heat). Examples of the latter materials are: LiF; $CaF_2$; $SrF_2$; NaCl and other metal salts or mixtures thereof.

If a plurality of reservoirs are present for the heat-accumulating material, they may be arranged to be independent of each other or be connected in series with or parallel to each other by way of one or more common filling and/or discharge ducts.

Because the heating device is operated over a wide temperature range (from room temperature to temperatures beyond 1500° C), the reservoirs cannot be completely filled, because the fact that the volume of the heat-accumulating material increases as the temperature increases should be taken into account. The volume increase of melting heat-accumulating metal salts generally amount to 20% to 30%, going from room temperature to operating temperature.

In practice, this fact is usually taken into account by choosing a suitable filling degree for the reservoir, even though other solutions are also feasible, for example, the use of an overflow reservoir for liquid metal salt.

The following problem occurs in the known heating devices. In order to ensure that the evaporation/condensation process of the heat transport medium in the closed space can properly take place, this space is normally evacuated. A substantial vacuum then prevails in the closed space at room temperature. As the operating temperature of the device increases, the vapour pressure of the heat transport medium in the closed space strongly increases. This means that the reservoir walls on the outside are subject to strongly varying pressures, the largest pressure occurring at the highest operating temperature.

Inside the partly filled reservoirs, however, usually a very low pressure prevails, because the reservoirs are usually also evacuated after provision of the heat-accumulating material and before closing, notably to prevent oxidation of the heat-accumulating material by oxygen present in the air. As the temperature of the heat-accumulating material increases, the pressure inside the reservoirs remains constantly low. This is not only applicable to solid heat-accumulating materials, but also to materials which change over to the liquid phase when heated. This is because the vapour pressures of the commonly used heat-accumulating metal salts in liquid form are very low at the temperature levels occurring (below 1 Torr (= 1 mm mercury pressure)).

As a result, the reservoir walls are subjected to strongly varying and large mechanical stresses, because of the variable pressure difference between the variable heat transport medium pressure in the closed space on the one side, and the substantially constant, very low pressure in the reservoir on the other side. The reservoir walls must thus be thick, since they have to be capable of withstanding the largest pressure differences occurring at the highest operating temperatures. Thick reservoir walls, however, have a high thermal resistance and lead to a heavy construction of the device.

The present invention has for its object to provide an improved heating device in which the described drawbacks have been eliminated in a simple manner.

SUMMARY OF THE INVENTION

In order to realize the above described objective, the heating device according to the invention is characterized in that an evaporable heat transport medium is also present in each of the reservoirs for equalizing or substantially equalizing the pressure in the reservoirs and the pressure outside in the closed space occurring at any temperature.

Substantially the same temperature prevails on both sides of the reservoir walls in any operating condition. Because a quantity of heat transport medium has also been added to the reservoirs, the vapour pressure on both sides of the reservoir walls is also substantially the same at any temperature. The reservoir walls may now be thin walls having a low thermal resistance, which on the one hand reduces the weight of the device and makes it cheaper, while on the other hand improves transfer of heat between the heat-accumulating material in the reservoirs and the heat transport medium outside the reservoir in the closed space. This is achieved without special aids (for example, a pressure control device reacting to the pressure in the closed space) being used.

It may occur that the heat transport medium added to the reservoir tends to enter into a chemical reaction with the heat-accumulating material, so that the proper operation of the device might be disturbed. In order to eliminate such a possibility, a preferred embodiment of the heating device according to the invention is characterized in that in each of the reservoirs, a flexible, movable partition is provided between the heat-accumulating material and the evaporable heat transport medium. The partition may be, for example, a metal foil which is made, for example, of the same material as the reservoir walls.

The invention furthermore relates to a hot-gas reciprocating machine, such as a hot-gas engine and a hot-gas turbine, comprising a working medium which performs a thermodynamic cycle in a closed working space, heat being applied to the said working medium from without. According to the invention, the hot-gas reciprocating machine is provided with a heating device as described.

The invention will be described in detail hereinafter with reference to the drawing which is diagrammatic and not to scale.

DETAILED DESCRIPTION OF THE PREFERRED EMBODIMENTS

Figure 1:
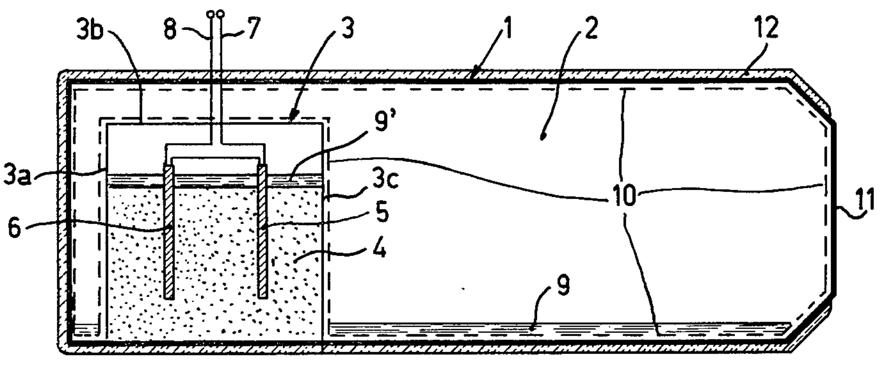
FIG. 1 is a longitudinal sectional view of a heating device in which a small quantity of heat transport medium is present above the heat-accumulating material in the reservoir.

The reference 1 in FIG. 1 denotes a closed tube which bounds a closed space 2 in which a closed reservoir 3 is arranged which is mainly filled with a heat-accumulating material 4, for example, a mixture of the metal salts NaF and $MgF_2$. Heat can be applied to this meltable salt mixture by means of the electrical heating elements 5 and 6 which are connected in series in the present embodiment via electrical supply wires 7 and 8 which are passed through the wall of tube 1.

The reservoir 3 comprises heat-transmitting walls *3a-3b-3c* through which the heat-accumulating material can exchange heat with a heat transport medium 9, for example, sodium, in the closed space 2. The inner walls of tube 1 and the outer sides of the reservoir walls *3a-3b-3c* are covered with a capillary structure 10, which is formed, for example, by one or more layers of metal gauze. Tube 1 furthermore comprises a heat-transmitting wall 11, wherethrough heat can be transferred to a heat user or object to be heated, not shown. The remainder of tube 1 is thermally insulated from the surroundings by means of a thermal-insulating material layer 12.

During operation, when the heat-accumulating material 4 has been "charged" by the heating elements 5 and 6 as the primary heat source, this material transfers heat as a secondary heat source, via the reservoir walls *3a-3b-3c*, to heat transport medium 9 in space 2 which, consequently, evaporates and flows in the vapor phase to the heat-transmitting wall 11, because a lower temperature and pressure prevail at this wall. The heat transport medium vapour condenses on wall 11 while giving off heat thereto. The condensate is subsequently returned to reservoir 3 through the capillary structure 10 because of capillary forces while utilizing the surface tension of the condensate, the condensate subsequently spreading over the entire surface of the walls *3a-3b-3c* via the capillary structure. Complete and uniform wetting of the reservoir walls is thus ensured.

At the start of the heat transport to the wall 11, when the heat-accumulating material 4 in the reservoir 3 and the heat transport medium 9 in space 2 are both at their highest and mutually substantially equal temperature, the vapour pressure in space 2 also has its highest value. The vapour pressure of the mixture of metal salts in the reservoir, however, is then still below 1 Torr. In order to ensure that at any temperature the pressures on both sides of the reservoir walls *3a-3b-3c* are equal or substantially equal, a quantity of evaporable heat transport medium, denoted by the reference numeral 9', has also been added to reservoir 3. At any temperature level of reservoir 3 and space 2, this heat transport medium 9' produces a vapour pressure which is equal to the vapour pressure of heat transport medium 9 occurring at the relevant temperature level. Because of the negligibly small partial vapour pressure of the heat-accumulating material 4, this means that in substantially any operating condition substantially equal operating pressures prevail on both sides of the reservoir walls *3a-3b-3c*. The said walls are thus constantly subjected to a low load (only the weight of the heat-accumulating material is of importance in this respect), so that the reservoir walls are thin and represent low thermal resistances in the heat exchange process.

Figure 2:
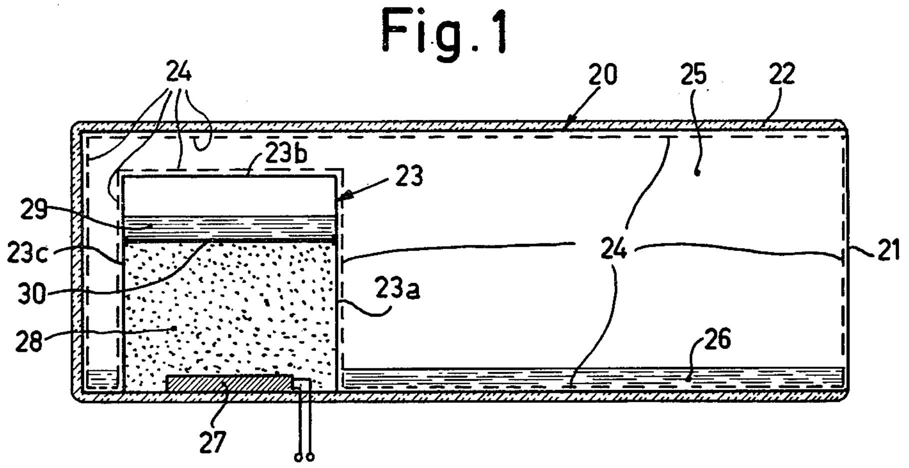
FIG. 2 is a longitudinal sectional view of a second heating device in which the heat transport medium and the heat-accumulating material inside the reservoir are separated from each other by a flexible, movable partition.

The heating device shown in FIG. 2 comprises a tube 20 having a heat-transmitting wall 21, and a heat-insulating layer 22. Inside the tube 20 there is arranged a reservoir 23 having heat-transmitting walls *23a-23b-23c* which communicate, by way of a capillary structure 24, with tube wall 21. Space 25 inside tube 20 again contains a quantity of evaporable heat transport medium 26, in this case calcium. Inside reservoir 23 there is arranged a heating element 27 as a primary heat source in heat-accumulating material 28, in this case NaF, which is separated from a quantity of evaporable calcium 29 by a thin metal wall 30 which is connected to the inner wall of reservoir 23 along its circumference, but which is constructed to be flexible such that the contraction and expansion of the NaF can be completely followed. Thus on both sides of the partition 30 always the same pressure prevails. The partition ensures that the calcium cannot react with the sodium fluoride to form calcium fluoride and free sodium.

Figure 3:
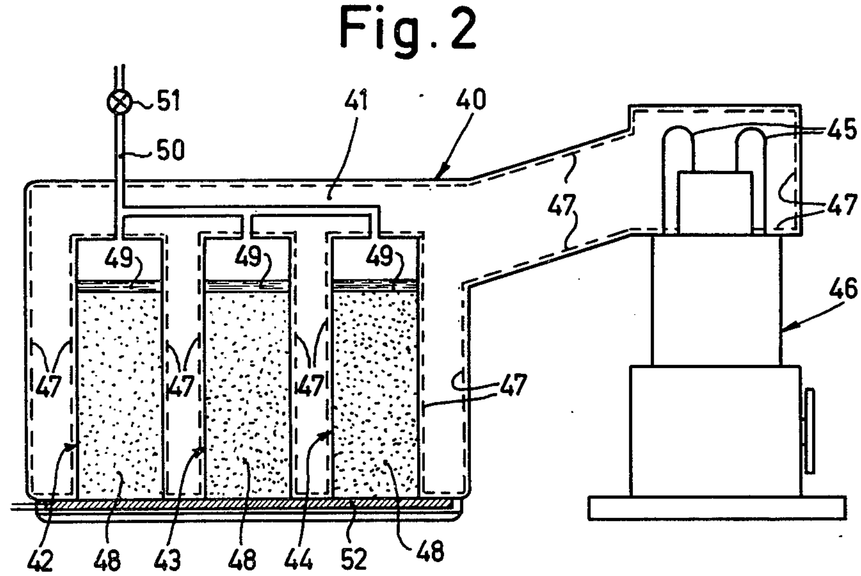
FIG. 3 is a longitudinal sectional view of a hot-gas reciprocating engine, comprising a heating device which is equipped with three reservoirs for heat-accumulating material.

The operation of the device is the same as that of the device described with reference to FIG. 1. FIG. 3 shows a combination of a hot-gas engine and a heating device. Tube 40 bounds a closed space 41 in which on the one side three reservoirs 42, 43, 44 are arranged, and on the other side the heater parts 45 of a hot gas engine 46, are arranged. The walls of tube 40 are covered on the inside with a capillary structure 47, while the heat-transmitting walls of the reservoirs 42, 43 and 44 are covered with a capillary structure 47 on the outer side. Inside the reservoirs a heat-accumulating material 48 is present, and above this material a small quantity of evaporable heat transport medium 49 is provided, the said medium being of the same kind as the heat transport medium present in space 41 (not shown).

The reservoirs 42, 43 and 44 are in open communication with each other and are connected to a common filling and discharging duct 50 which is closed by means of a valve 51. For the primary heat source use is made of an electrical heating element 52 which applies heat to heat accumulating material 48 directly as well as by way of evaporation of the heat transport medium in space 41. When this material gives off heat to the heat transport medium in space 41 via the heat-transmitting reservoir walls, the heat transport medium evaporates, flows to the heater pipes 45 and condenses thereon while giving off heat through the heater pipe walls to the working medium in the engine which flows through these pipes (for example, helium or hydrogen). The condensate formed on the heater pipes is returned, via the capillary structure 47, to the reservoirs 42, 43, 44 so as to be evaporated again.

The heat transport medium 49 inside the reservoirs 42, 43, 44 again ensures that at any operating temperature the pressure level in the reservoirs is at least substantially equal to that in the space 41.

What is claimed is:

1. A heating device for supplying heat to a heat user, comprising a closed space within which one or more closed reservoirs are arranged which in operation contain a heat-accumulating material which can be heated by means of at least one primary heat source, the said heat-accumulating material being adapted to act as a secondary heat source for exchanging heat, via one or more heat-transmitting reservoir walls, with a heat transport medium which is present in the closed space and which transports heat from the reservoirs to the heat user by an evaporation/condensation cycle, characterized in that an evaporable heat transport medium is also present in each of the reservoirs for equalizing or substantially equalizing the pressure in the reservoirs and the pressure outside the reservoirs in the closed space occurring at any temperature.

2. A heating device as claimed in claim 1, characterized in that in each of the reservoirs a flexible, movable partition is provided between the heat-accumulating material and the evaporable heat transport medium.

3. A hot gas reciprocating machine, comprising a working medium in a closed space whereto heat can be applied from without, characterized in that the machine comprises a heating device as claimed in claim 1.

4. In a heating system operable in a selected temperature range, including a first container which is a heat pipe formed by walls having inner surfaces which define a first closed space, and within said space a second container formed by walls having outer surfaces, and also having inner surfaces which define a second closed space containing a quantity of heat-accumulating material, and said heating system further including means for heating said heat-accumulating material, and in said first space a quantity of heat transport medium that cycles in the operating temperature range of the system, between vapor and liquid states, and continuous capillary material on and communicating between said inner and outer wall surfaces, the improvement in combination therewith comprising in said second space a quantity of pressure-equalizing vaporizable liquid which has in the operating temperature range of said heating system, vapor pressure characteristics generally similar to those of said heat-transport medium, whereby the vapor pressure in said first and second spaces is, in said operating temperature range, generally the same.

5. Apparatus according to claim 4 wherein said second container further comprises a flexible partition dividing said second space into two, separate third and fourth spaces, with said heat-accumulating material in said third space and said pressure-equalizing vaporizable liquid in said fourth space, for equalizing the vapor pressure in said first and third spaces.

6. Apparatus according to claim 4 wherein said heat-accumulating material remains solid in said operating temperature range.

7. Apparatus according to claim 6 wherein said heat-accumulating material is one selected from the group consisting of $Al_2O_3$, BeO, TiO, $MgO_2$ and $SiO_2$.

8. Apparatus according to claim 4 wherein said heat-accumulating material is meltable.

9. Apparatus according to claim 8 wherein said heat-accumulating material is one selected from the group consisting of LiF, $CaF_2$, $SrF_2$, $MgF_2$, NaF, NaCl and other metal salts and mixtures thereof.

10. A hot-gas reciprocating machine including a heater part for receiving heat, in combination with a heating system as defined in claim 4, wherein said heater part is situated within said first space for receiving heat from the heat-transporting medium therein.

11. In a heat pipe operable within a selected temperature range and formed by walls having inner surfaces defining a first closed space, continuous first capillary material on said surfaces, and within said first space a heat-transport medium which cycles between liquid and vapor states, and also within said first space a heat source comprising a container formed by wallw which define a second closed space containing therein a quantity heat-accumulating material, said container walls having outer surfaces with continuous second capillary material on said outer surfaces and communicating with said first capillary material, the improvement in said heat source comprising a quantity of vaporizable liquid in said second space, said liquid having, in said operating temperature range, vapor pressure characteristics generally similar to those of said heat transport medium, whereby the vapor pressure in said first and second spaces is generally the same in said operating temperature range of said heat pipe.

12. Apparatus according to claim 11 wherein said vaporizable liquid in said second space is substantially the same as said heat-transport medium.

13. Heat pipe apparatus according to claim 11 in combination with a hot-gas machine which includes a heater part which is in heat-conductive relationship with said heat-transport medium in said first space.

14. Apparatus according to claim 11 wherein said heat transport medium is a fluid selected from the group consisting of $Al_20_3$, Be0, TiO, $Mg0_2$, $SiO_2$ and mixtures of said substances, and said heat-accumulating material is a substances selected from the group consisting of LiF, $CaF_2$, $SrF_2$, $MgF_2$, NaF, NaCl and other metal salts and mixtures of said substances.

* * * * *